US011937123B2

(12) United States Patent
Li et al.

(10) Patent No.: US 11,937,123 B2
(45) **Date of Patent: *Mar. 19, 2024**

(54) SYSTEMS AND METHODS FOR CONGESTION CONTROL ON MOBILE EDGE NETWORKS

(71) Applicant: Verizon Patent and Licensing Inc., Basking Ridge, NJ (US)

(72) Inventors: Feng Li, Lexington, MA (US); Haim S. Ner, Fair Lawn, NJ (US); Parry Cornell Booker, Arlington, TX (US); Ning Chen, Harvard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,327

(22) Filed: Dec. 14, 2021

(65) Prior Publication Data

US 2022/0104066 A1 Mar. 31, 2022

Related U.S. Application Data

(63) Continuation of application No. 16/593,063, filed on Oct. 4, 2019, now Pat. No. 11,234,159.

(51) Int. Cl.

*H04L 47/27* (2022.01)
*H04L 47/283* (2022.01)
*H04W 28/02* (2009.01)

(52) U.S. Cl.

CPC ......... *H04W 28/0289* (2013.01); *H04L 47/27* (2013.01); *H04L 47/283* (2013.01)

(58) Field of Classification Search

CPC ..... H04L 43/08; H04L 43/0817; H04L 43/10; H04L 47/12; H04L 47/27; H04L 47/193; H04W 40/00

USPC ................................ 370/229, 231, 235, 328

See application file for complete search history.

(56) References Cited

U.S. PATENT DOCUMENTS

2006/0268708 A1* 11/2006 Speight ................. H04L 47/193 370/235
2013/0336213 A1* 12/2013 Mimura .................. H04L 47/27 370/328
2015/0271225 A1 9/2015 Mao et al.
2017/0310601 A1* 10/2017 Yu ....................... H04L 43/0817
2018/0176136 A1* 6/2018 Yang ..................... H04L 47/193
2022/0078121 A1* 3/2022 Romero Ruiz ......... H04L 43/10

* cited by examiner

*Primary Examiner* — Harun Chowdhury

(57) ABSTRACT

A network device receives, from a congestion controller, traffic policy information associated with a data stream between a sender and a receiver, where the traffic policy information includes a maximum round trip delay time (RTT) and a maximum throughput rate (Rate). The network device obtains a receiver advertised window size (RWND) for the receiver for the data stream. The network device modifies the RWND based on the RTT and the Rate to produce a modified receiver window size (RWND') and sends the RWND' to the sender for use in controlling congestion on the data stream between the sender and the receiver.

20 Claims, 6 Drawing Sheets

SYSTEMS AND METHODS FOR CONGESTION CONTROL ON MOBILE EDGE NETWORKS

RELATED APPLICATION

The patent application is a continuation of U.S. patent application Ser. No. 16/593,063 filed on Oct. 4, 2019, titled "SYSTEMS AND METHODS FOR CONGESTION CONTROL ON MOBILE EDGE NETWORKS," the disclosure of which is hereby incorporated by reference herein in its entirety.

BACKGROUND

Next Generation mobile networks have been proposed as the next evolution of mobile wireless networks, such as the existing 4G and 4.5G Long Term Evolution (LTE) mobile networks. Next Generation mobile networks, such as Fifth Generation New Radio (5G NR) mobile networks, may operate in the higher frequency ranges (e.g., in the Gigahertz frequency band) with a broad bandwidth about 500-1,000 Megahertz. The expected bandwidth of Next Generation mobile networks is intended to support higher speed downloads. The proposed 5G mobile telecommunications standard may operate in the millimeter wave bands (e.g., 14 Gigahertz (GHz) and higher), and may support more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless systems, permitting a greater density of wireless users. Next Generation mobile networks are designed to increase data transfer rates, increase spectral efficiency, improve coverage, improve capacity, and reduce latency.

DETAILED DESCRIPTION OF THE PREFERRED EMBODIMENTS

Figure 1:
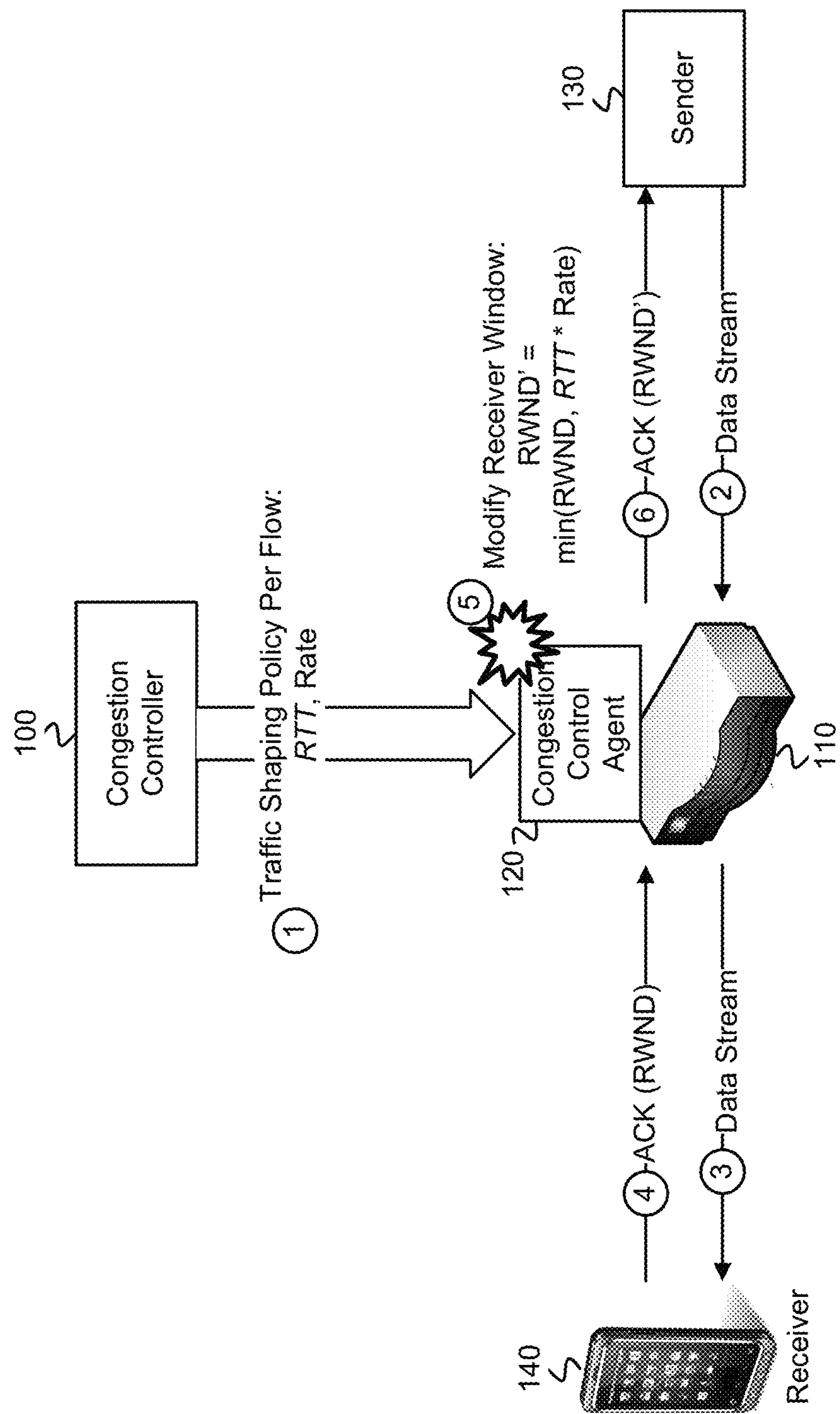
FIG. 1 depicts an overview of active congestion control, applied at a mobile edge network, of exemplary embodiments described herein.

The following detailed description refers to the accompanying drawings. The same reference numbers in different drawings may identify the same or similar elements. The following detailed description does not limit the invention.

With the use of millimeter wave radio links, Next Generation Mobile networks (e.g., 5G or later mobile networks) can potentially provide a higher link capacity than residential optical fiber connections. The high capacity of millimeter wave radio links, however, also imposes new challenges on transport layer protocols having congestion control mechanisms, such as the Transmission Control Protocol (TCP). TCP uses the bandwidth delay product (BDP) to maximize the link utilization of data links. BDP is the product of a data link's capacity and the link's round-trip delay time (RTT) between a TCP sender and a TCP receiver. BDP represents a maximum amount of data transmitted over a link between the TCP sender and the TCP receiver without an acknowledgement. Therefore, Next Generation networks may transport large amounts of data over a given radio link without acknowledgement. A large BDP can improve link utilization, but a large amount of transported unacknowledged data can also be detrimental to network performance. For example, a large amount of unacknowledged data being transported on the network can consume a large amount of buffer space inside wireless access devices (e.g., switches, eNodeBs, or gNodeBs) and can trigger "buffer bloat" within these devices. Also, a large amount of unacknowledged transported data can trigger a high retransmission ratio when retransmission timeout (RTO) occurs. Increasing of the retransmission ratio reduces the output of the system, especially when congestion or buffer bloat occurs that causes a large number of packets to be dropped inside network devices due to lack of buffer space.

Active Queue Management (AQM) is one scheme that has been introduced to relieve transport congestion. AQM is a queue management scheme that avoids high queuing delay when congestion occurs. When queue times associated with enqueued packets are longer than a given threshold time, an AQM queue controller drops the packets to relieve congestion. However, due to the design of TCP protocol, the packets dropped as a result of AQM have to be retransmitted, possibly with up to three retransmission attempts. The retransmission caused by AQM, thus, can make congestion even more severe, especially when a large BDP is being used.

Exemplary embodiments described herein implement an active congestion control scheme that deals with the challenges of the large capacity of Next Generation mobile networks, such as 5G mobile networks. Unlike other congestion control schemes, the exemplary embodiments described herein enable the sending device to reduce its packet sending rate without introducing packet dropping or without increasing the packet retransmission rate. As described herein, a congestion control agent, based on traffic shaping policy parameters provided by a central congestion controller, modifies a receiver's receiver advertised window size (RWND), in transmit to the sender, to prevent overflooding of the receiver's receive buffer subsequent to the modified receiver advertised window size being received at the receiver. In one implementation, the congestion control agent may be implemented at an edge router in the mobile network such that packets on the data stream, Transmission Control Protocol (TCP) Synchronization (SYN) packets, TCP SYN-acknowledgement (SYN-ACK) packets, and data stream ACK packets/segments, sent between the sender and receiver, may all be routed and forwarded through the edge router.

FIG. 1 depicts an overview of active congestion control, applied at a mobile edge network, of exemplary embodiments described herein that enables a sender to reduce its data sending rate without increasing the packet dropping rate or the packet retransmission rate. As shown, a congestion controller 100 provides traffic shaping policy parameters (identified with a number "1" within a circle) per flow of traffic handled by a network edge router 110. A data "flow" or "stream," as used interchangeably herein, each refers to a sequence of packets sent between a particular sender and a particular receiver over a network for a particular session. The traffic shaping policy parameters per flow include a specified maximum round trip delay time (RTT) and a maximum rate (Rate) (i.e., throughput) for each particular flow. A congestion control agent 120, executing in association with network edge router 110, receives the traffic shaping policy parameters and extracts the RTT and the rate parameters.

A sender 130 subsequently sends a data stream (identified with a "2" within a circle) to a receiver 140 across a network (not shown), with the data stream being transporting through network edge router 110 to reach receiver 140. Upon receipt of the packet(s) of the data stream, network edge router 110 routes and forwards the packet(s) of the data stream (identified with a "3" within a circle) towards the destination receiver 140. Upon receipt of the packet(s) of the data stream sent from sender 130, receiver 140 returns an acknowledgement (ACK) message (identified with a "4" within a circle) that includes the receiver 140's advertised window size (RWND). The advertised window size RWND identifies receiver 140's currently available buffer size for buffering incoming packets of the data stream.

Upon receipt of the ACK from receiver 140, congestion control agent 120 extracts the RWND from the ACK message and modifies (identified with a "5" within a circle in FIG. 1) the window size based on the traffic shaping parameters (e.g., RTT, Rate) received from congestion controller 100. In one exemplary implementation, congestion control agent 120 may generate a modified receiver window size RWND' based on a minimum of the RWND, and a product of the RTT and Rate (i.e., throughput) values from the traffic shaping policy parameters received from congestion controller 100 for the flow/stream:

$$RWND'=\min(RWND,RTT*Rate) \qquad \text{Eqn. (1)}$$

Congestion control agent 120 replaces the original RWND in the ACK message with the modified RWND' and forwards the ACK message (identified with a "6" within a circle) to the sender 130.

Sender 130, after receipt of the ACK message with the modified RWND' subsequently sends packets in the data stream to receiver 140 based on the modified RWND'. Sender 130 may, in some implementations, send packets in the data stream to the receiver 140 based further on a window scaling factor (WSF). WSF is an option in TCP that permits the sender 130 to increase the receive window size above a transport protocol's maximum value (e.g., above 65,535 bytes for TCP). In one implementation, sender 130 may determine a send window size based on a minimum of the modified RWND' and a congestion window size determined by the sender. The congestion window size (CWND) indicates a maximum amount of data that the sender 130 can stream into the network before receiving an ACK. By using the modified RWND' when congestion occurs, the congestion control technique described herein decreases the sender's data transmission rate on a given data stream while avoiding an increase in a packet dropping rate or a retransmission rate for the data stream.

Congestion controller 100 may change the traffic shaping policy parameters per flow (e.g., RTT and Rate) at any time during transport of the data stream between sender 130 and receiver 140. Therefore, congestion control agent 120, based on newly received traffic shaping policy parameters for the data stream/flow, may return a new modified RWND' in a next ACK message, received from receiver 140 and destined for sender 130. Though FIG. 1 depicts a mobile device as receiver 140 and another device as sender 130, the two endpoints engaged in a given session may both act as senders and receivers. For example, if receiver 140 streams data to sender 130, then the directions of the data stream ("2" and "3") and the acknowledgement messages ("4" and "6") would be reversed relative to that shown in FIG. 1.

Figure 2:
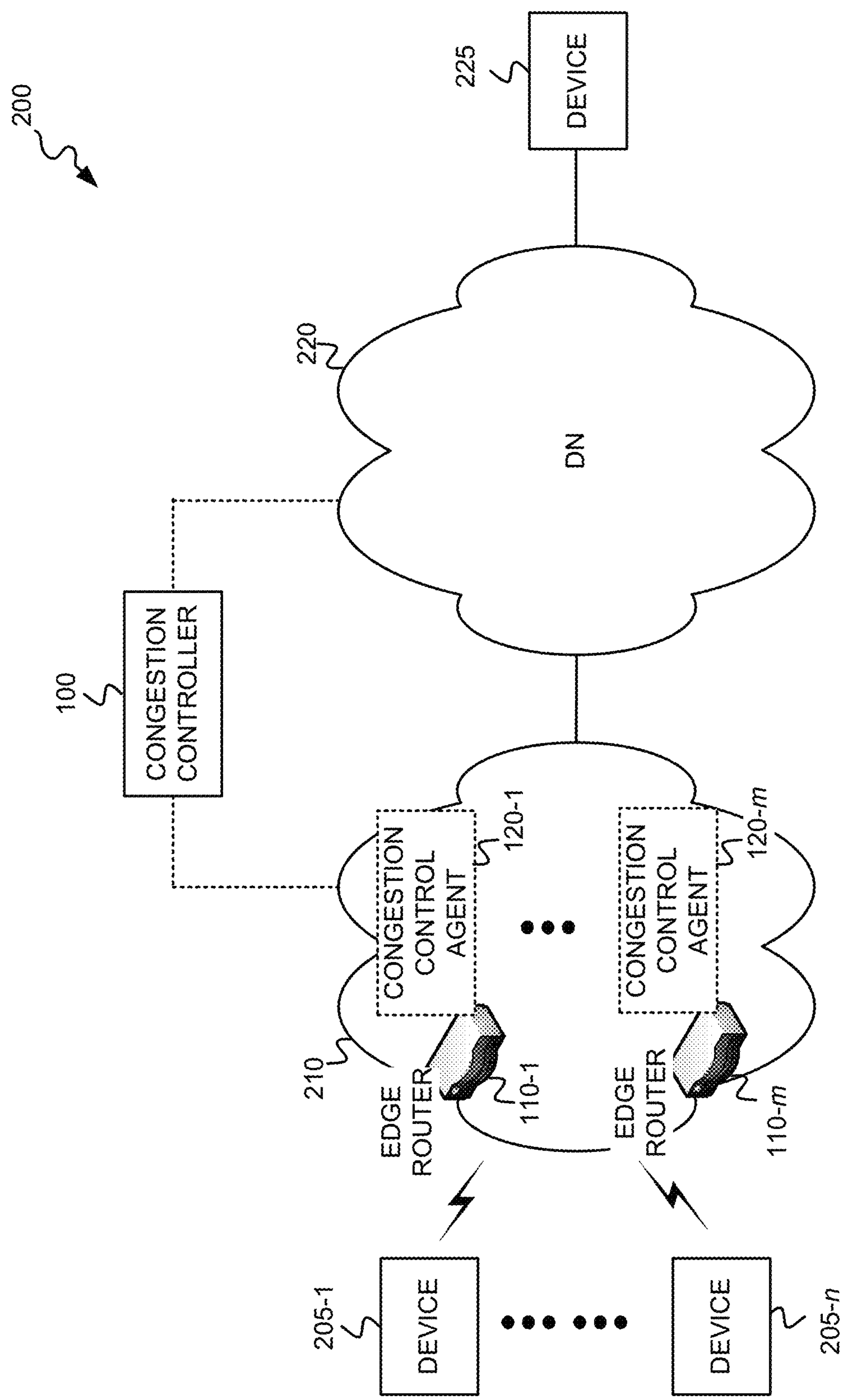
FIG. 2 illustrates an exemplary network environment in which the active congestion control techniques, described herein, are applied to control congestion on data streams transported between senders and receivers.

FIG. 2 illustrates an exemplary network environment 200 in which the active congestion control techniques described herein are applied to control congestion on data streams transported between senders and receivers. As shown, network environment 200 may include multiple devices 205-1 through **205-*n* (where n is greater than or equal to one), a congestion controller 100, an edge network 210, a data network (DN) 220, and a device 225**.

Devices 205-1 through **205-*n* (referred to herein generically as "device 205" or "devices 205" may each include any type of electronic device having a wired or wireless network communication capability. Each of the devices 205 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a set-top box (STB), or an IoT or M2M device. A respective user (not shown) may carry, use, administer, and/or operate one or more of devices 205. Each of devices 205 may correspond to the receiver 140 shown in FIG. 1. One or more of devices 205** may be a mobile device, such as a tablet computer or a smart phone, having wireless network communication capability.

Congestion controller 100 includes one or more network devices that interconnect with edge network 210 and/or DN 220. In one implementation, congestion controller 100 may be deployed in a Software Defined Network (SDN) environment inside a cloud computing environment. Congestion controller 100 may set traffic shaping policies for individual flows, or for groups of flows. The traffic shaping policy that applies to each particular flow may include a desired maximum round trip delay time (RTT) and a maximum throughput (Rate). Congestion controller 100 may determine the traffic shaping policy (e.g., RTT and Rate) for each flow, or for a group of flows, based on parameters provided by a network management entity (not shown). For example, the network management entity may specify a desired maximum RTT for a flow(s) that is designed to avoid triggering AQM packet dropping. As another example, the network management entity may specify a maximum Rate for a flow involving a particular type of application to enable adequate data transfer (e.g., a sufficient Quality of Service (QoS) for the particular application) for the application but to also allocate sufficient available link bandwidth to other flows. The network management entity may use various different types of RTT estimation and application detection techniques. Congestion controller 100 may store the obtained traffic shaping policy parameters for the identified flows.

Edge network 210 may include one or more edge routers 110-1 through **110-*m* (where m is greater than or equal to one) that route data stream packets to mobile devices 205 from DN 220, and from mobile devices 205 to DN 220. In one implementation, edge network 210 may include, or connect to, a core cloud that includes the core components of a wireless network (e.g., a 5G wireless network) that serves to provide wireless access to devices 205. In another implementation, edge network 210 may include an edge cloud that further includes one or more edge computing data centers, and/or other edge devices, that enable the movement of traffic from a core cloud (not shown, but connected between the edge cloud and DN 220) towards the edge of network environment 200 and closer to the destination devices 205. Instead of sending packets to the core cloud for processing, routing, and transport, the edge cloud includes components that handle the data closer to the destination mobile devices, thereby reducing latency. In this implementation, edge network 210** may include, for example, a Multi-Access Edge Computing (MEC) network.

As shown in FIG. 2, each of edge routers 110-1 through **110-*m* may be associated with a respective one of congestion control agents 120-1 through 120-*m* (generically referred to herein as "congestion control agent 120" or "congestion control agents 120"). In some implementations, each congestion control agent 120 may be implemented in hardware and/or software at each respective edge router 110. In other implementations, each congestion control agent 120 may be implemented as hardware and/or software in a stand-alone device that is connected to a respective edge router 110. Congestion controller 100 may retrieve stored traffic shaping policy parameters for particular flows/streams and send the parameters to respective edge routers 110 involved in routing particular flows. For example, if edge router 110-1 is routing data_stream_1 between a sender and a receiver, congestion controller 110 may send traffic shaping policy parameters for data_stream_1 to edge router 110-1 for use by the congestion control agent 120-1 associated with edge router 110-1. Based on traffic shaping policy parameters received from congestion controller 100, each congestion control agent 120** may modify the receiver advertised window size (RWND) for each flow, as described in further detail below, to produce a modified receiver advertised window size (RWND') that may be returned to each flow's sending device and used by that sending device for controlling congestion on the particular flow.

DN 220 may include any type of packet-switching network(s) that can connect to edge network 210 for transporting data to and from nodes that are external to edge network 210, such as device 225. DN 220 may include, for example, the Internet, a local area network(s) (LAN), a wide area network(s) (WAN), or a metropolitan area network (MAN).

Device 225 includes any type of electronic device having a wired and/or wireless network communication capability. Device 225 may include, for example, a laptop, palmtop, desktop, or tablet computer; a server computer; a PDA; a cellular phone (e.g., a "smart" phone); a VoIP phone; a smart TV; an audio speaker (e.g., a "smart" speaker); a video gaming device; a music player (e.g., a digital audio player); a digital camera; a STB, or an IoT or M2M device. Though only a single device 225 is shown in FIG. 2, multiple devices 225 may connect to DN 220 for sending data streams to, or receiving data streams from, devices 205. Device 225 may correspond to the sender 130 shown in FIG. 1.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, though a single congestion controller 100 is shown, multiple distributed congestion controllers 100 may connect to edge network 210 and/or DN 220 and operate to control congestion over, for example, a particular portion of edge network 210 (e.g., a different congestion controller 100 assigned to each different "network slice" of a Next Generation mobile network).

Figure 3:
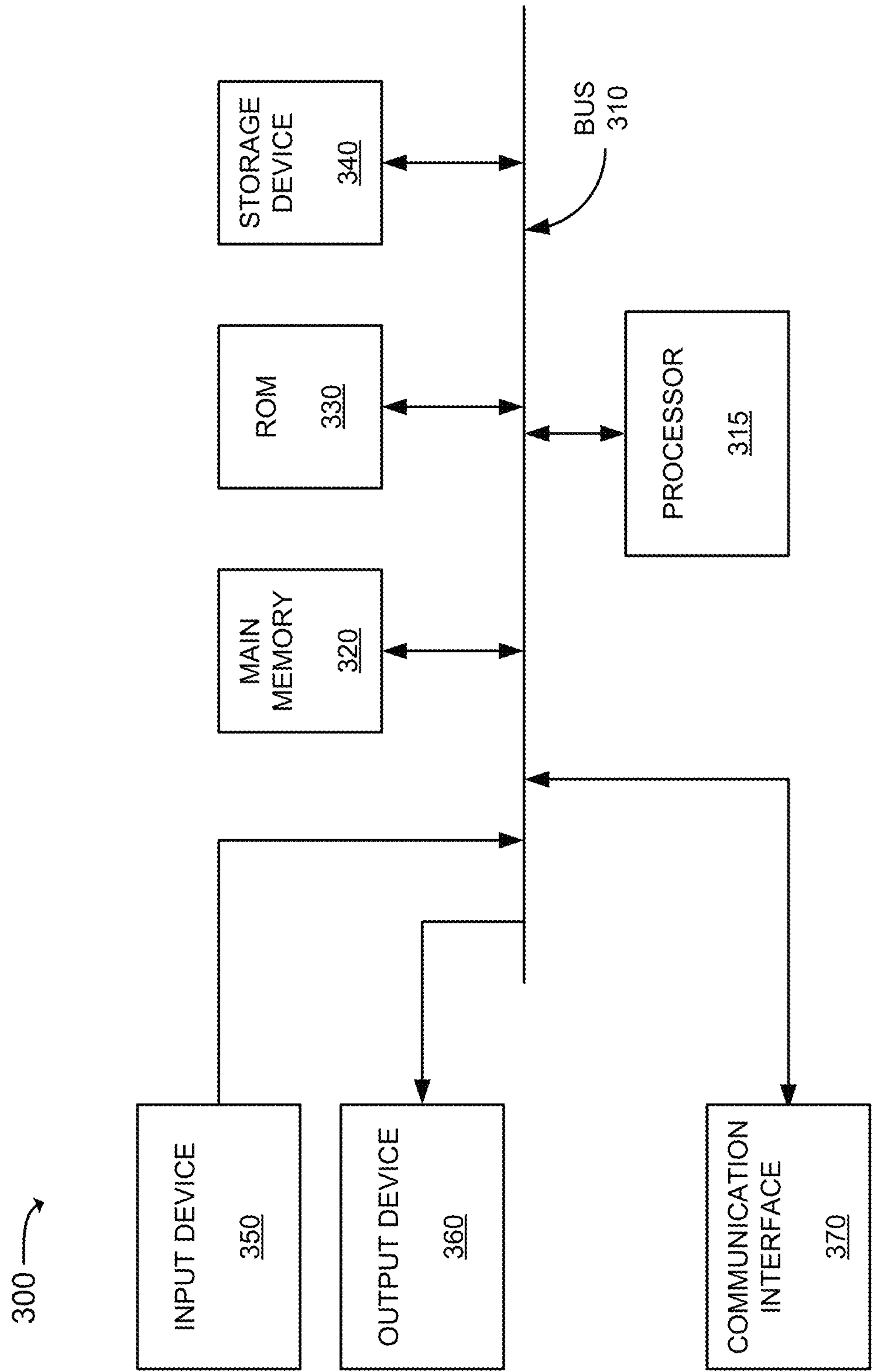
FIG. 3 is a diagram that depicts exemplary components of a device that may correspond to the edge routers and/or devices of FIG. 2.

FIG. 3 is a diagram that depicts exemplary components of a device 300. Edge routers 110, devices 205, device 225, congestion controller 100, and congestion control agents 120 may each include the same, or similar, components as device 300, and may be arranged in a similar configuration as the device 300. Device 300 may include a bus 310, a processor 315, a main memory 320, a read only memory (ROM) 330, a storage device 340, an input device 350, an output device 360, and a communication interface 370. Bus 310 may include a path that permits communication among the other components of device 300.

Processor 315 may include one or more processors or microprocessors which may interpret and execute stored instructions associated with one or more processes. Additionally, or alternatively, processor 315 may include processing logic that implements the one or more processes. For example, processor 315 may include, but is not limited to, programmable logic such as Field Programmable Gate Arrays (FPGAs) or accelerators. Processor 315 may include software, hardware, or a combination of software and hardware for executing the processes described herein.

Main memory 320 may include a random access memory (RAM) or another type of dynamic storage device that may store information and, in some implementations, instructions for execution by processor 315. ROM 330 may include a ROM device or another type of static storage device (e.g., Electrically Erasable Programmable ROM (EEPROM)) that may store static information and, in some implementations, instructions for use by processor 315. Storage device 340 may include a magnetic, optical, and/or solid state (e.g., flash drive) recording medium and its corresponding drive. Main memory 320, ROM 330 and storage device 340 may each be referred to herein as a "non-transitory computer-readable medium" or a "non-transitory storage medium." The processes/methods set forth herein can be implemented as instructions that are stored in main memory 320, ROM 330 and/or storage device 340 for execution by processor 315.

Input device 350 may include one or more devices that permit an operator to input information to device 300, such as, for example, a keypad or a keyboard, a display with a touch sensitive panel, voice recognition and/or biometric mechanisms, etc. Output device 360 may include one or more devices that output information to the operator, including a display, a speaker, etc. Input device 350 and output device 360 may, in some implementations, be implemented as a user interface (UI), such as a touch screen display, that displays UI information, and which receives user input via the UI. Communication interface 370 may include one or more transceivers that enable device 300 to communicate with other devices and/or systems. For example, communication interface 370 may include a wireless transceiver for communicating via edge network 210 via a wireless link. As another example, communication interface 370 may include a wired transceiver for communicating with edge network 210 via a wired link.

Device 300 may perform certain operations or processes, as may be described herein. Device 300 may perform these operations in response to processor 315 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface 370. The software instructions contained in main memory 320 may cause processor 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 300 illustrated in FIG. 3 is for illustrative purposes only. Other configurations may be implemented. Therefore, device 300 may include additional, fewer and/or different components, arranged in a different configuration, than depicted in FIG. 3.

Figure 4:
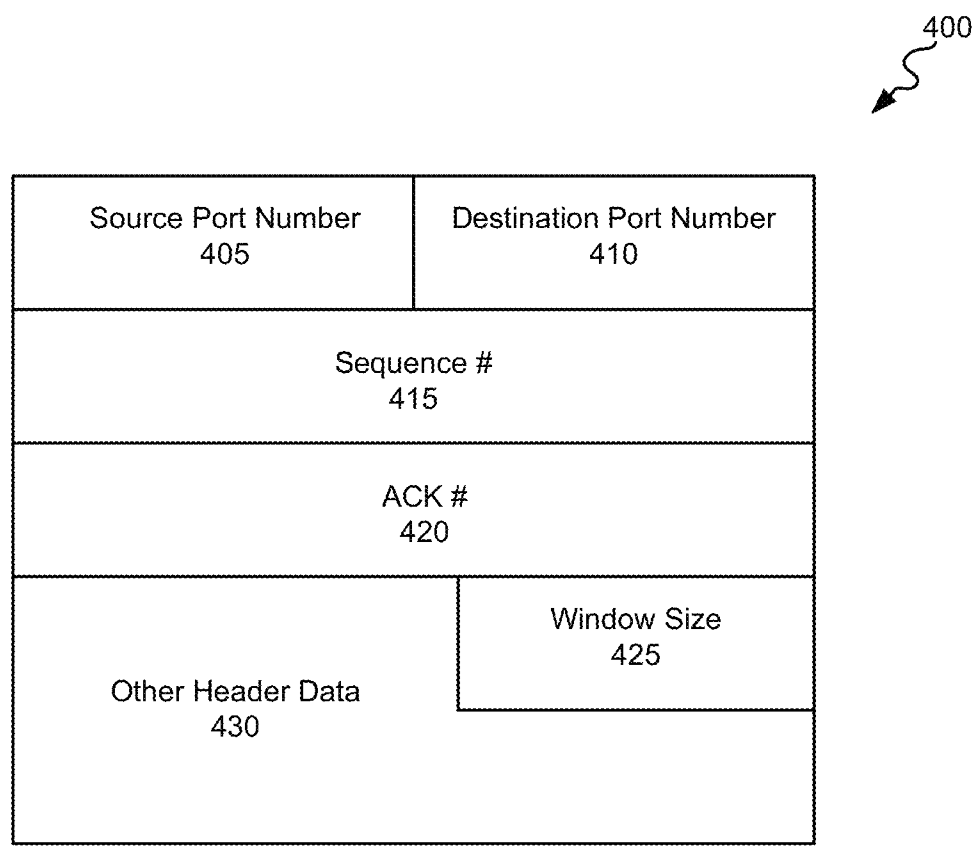
FIG. 4 illustrates an exemplary packet header that may be associated with each packet sent between the sender and receiver of FIG. 1.

FIG. 4 illustrates an exemplary packet header 400 that may be associated with each packet/segment sent between a sender 130 and a receiver 140. Packet header 400 may be associated with an ACK packet, a SYN packet, a SYN-ACK packet, or other types of packets sent between a sender 130 and a receiver 140. Packet header 400 may include a source port number field 405, a destination port number field 410, a sequence number field 415, an acknowledgement number field 420, a window size field 425, and other header data 430. In an implementation in which TCP is being used for transporting data streams/flows between a sender 130 and a receiver 140, packet header 400 may be associated with a TCP segment.

Source port number field 405 stores a number that identifies the source port of the sender 130 sending the packet. Destination port number field 410 stores a number that identifies the destination port of the receiver 140 destined to receive the packet. Sequence number field 415 stores a number that identifies the packet sequence number of the current packet in a data stream/flow between the sender 130 and receiver 140 for a current session. Acknowledgement number field 420 stores a next sequence number that the sender of the acknowledgement is expecting. Window size field 425 stores data that specifies the size of the receiver advertised window that further indicates the amount of data that the sender of the packet is currently willing to receive on a given data stream/flow for a current session. Other header data 430 stores other types of header data that are not further described herein (e.g., flags, checksum, etc.).

Packet header 400 may include additional fields, or fields storing other types of data, that are not shown in FIG. 4 for purposes of simplicity. Furthermore, packet header 400 may, in some implementations, include one or more different fields than those shown in FIG. 4.

Figure 5A:
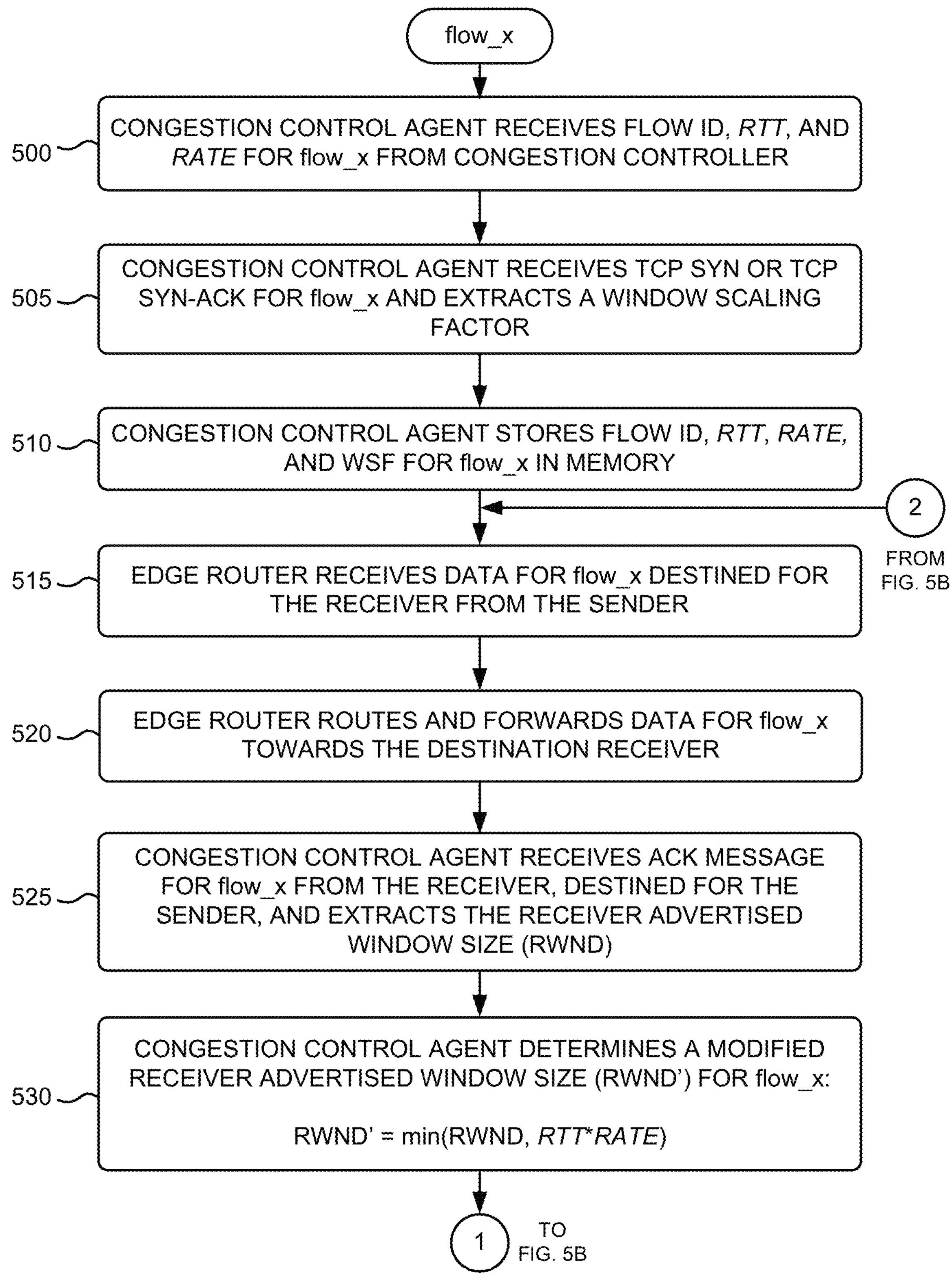
FIGS. 5A and 5B are flow diagrams that illustrate an exemplary process for modifying a receiver advertised window size (RWND) for use in congestion control for a data stream sent from a sender device to a receiver device.
Figure 5B:
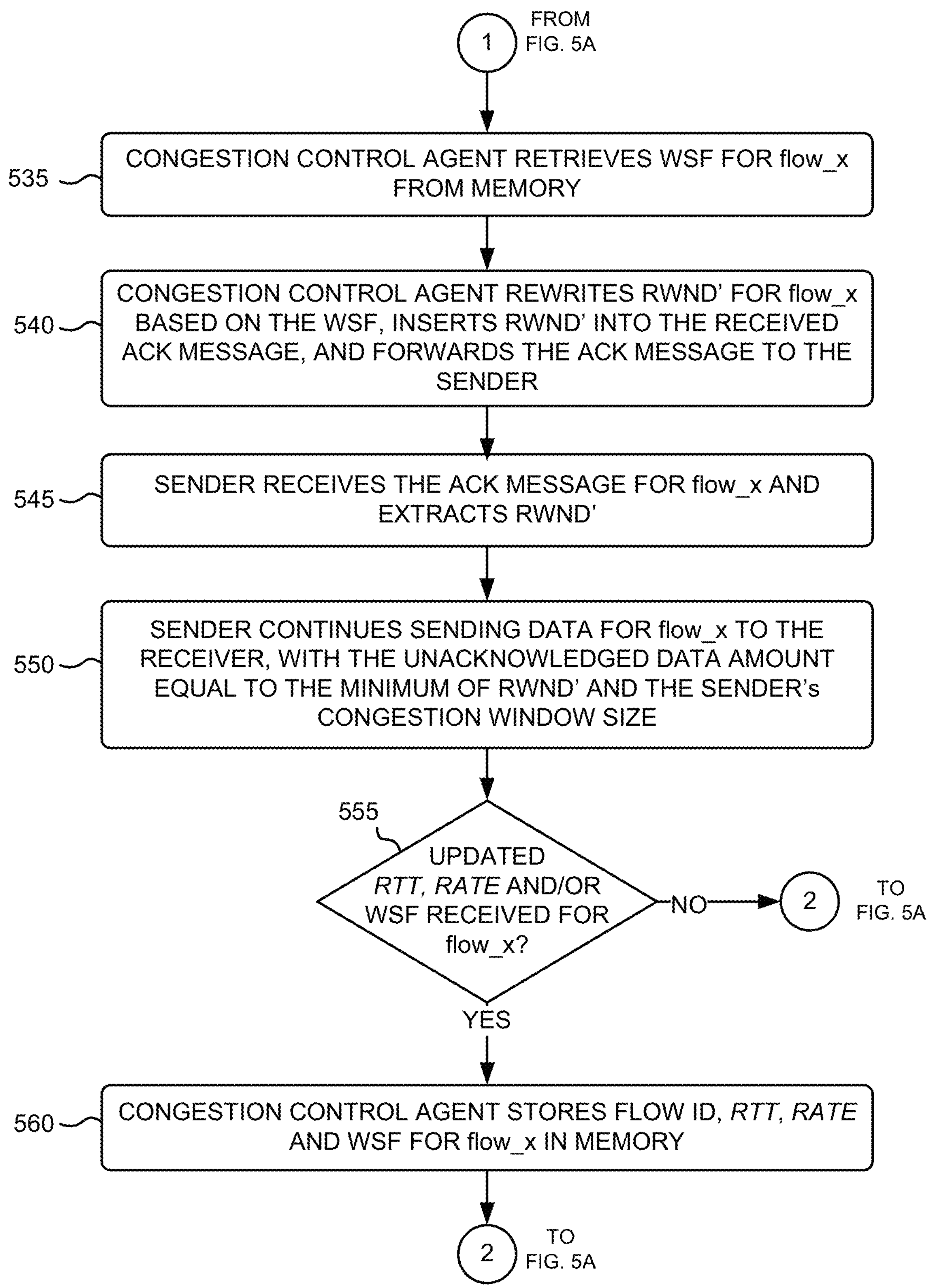

FIGS. 5A and 5B are flow diagrams that illustrate an exemplary process for modifying a receiver advertised window size RWND for use in congestion control for a data stream sent from a sender device to a receiver device. The exemplary process of FIGS. 5A and 5B may be implemented by a congestion control agent 120, an edge router 110, a sender 130, and a receiver 140.

The exemplary process includes congestion control agent 120 receiving a flow identifier (ID), a maximum RTT value, and a maximum Rate value for a flow_x from congestion controller 100 (block 500). Congestion controller 100 may send traffic shaping policy parameters to a congestion control agent 120 through which a given flow (flow_x) is being routed between a sender 130 and a receiver 140. In certain circumstances, the traffic shaping policy parameters may include the maximum RTT value and the maximum Rate value for a particular flow (flow_x). In other circumstances, the traffic shaping policy parameters may apply to a group of flows, such as all flows associated with the execution of a particular type of application at different senders 130.

Congestion control agent 120 receives a SYN or SYN-ACK message for flow_x and extracts a WSF from the message (block 505). If the transport protocol used for transporting a data stream between sender 130 and receiver 140 is TCP, then sender 130 may establish a connection with receiver 140 by sending a TCP SYN message to receiver 140. Receiver 140 accepts the connection request with a SYN-ACK message. A WSF value may be specified in either, or both, of the SYN or SYN-ACK messages. Therefore, either the sender 130 or the receiver 140 may specify a WSF to be used during transmission of packets on the data stream between the sender 130 and the receiver 140. Edge router 110, which resides on the edge of network 210 and receives packets on data streams from sender 130 to receiver 140, and packets on data streams from receiver 140 to sender 130, receives either of the SYN or SYN-ACK messages and forwards the message to the congestion control agent 120 for extraction of the WSF. Congestion control agent 120 stores the received flow ID, RTT, Rate, and WSF for flow_x in memory (block 510). Congestion control agent 120 may use the flow ID as a key value for storing and retrieving the received RTT, Rate and WSF from memory. In one implementation, the flow ID may include the receiver Internet Protocol (IP) address, the receiver port number, the sender IP address, and the receiver port number for the data flow being sent between the sender and the receiver. The memory may include local memory at the edge router 110, remote memory accessed via network 210 or network 220, or local memory in a stand-alone device that is connected to the edge router 110.

Edge router 110 receives data for flow_x destined for the receiver from the sender (block 515) and routes and forwards data for flow_x towards the destination receiver (block 520). Sender 130 (e.g., device 225) sends packets for a data stream that are destined for receiver 140 (e.g., device 205-1). The packets may be routed across DN 220 and edge network 210 to reach an edge router 110 that resides on an edge of network 210. Edge router 110 routes and forwards the packets for the data stream to the destination receiver 140 (e.g., device 205-1).

Congestion control agent 120 receives an ACK message for flow_x from the receiver, destined for the sender, and extracts the RWND (block 525). Upon receipt of the packets for the data stream/flow, receiver 140 returns an ACK message acknowledging receipt of the packets. The receiver 140 additionally determines a current available buffer size, sets the receiver advertised window size RWND based on the available buffer size, and inserts the RWND value into window size field 425 of the ACK message header 400.

Congestion control agent 120 determines a modified receiver advertised window size (RWND') for flow_x using, for example, Eqn. (1) (block 530). Congestion control agent 120 determines a product of the RTT and Rate values received from congestion controller 100 and compares the product to the RWND value. Congestion control agent 120 sets RWND' equal to a value of which one of RWND, or the product RTT*Rate, that has a least, or minimum, value.

Congestion control agent 120 retrieves the WSF for flow_x from memory (block 535). Congestion control agent 120 then rewrites RWND' for flow_x based on the retrieved WSF, inserts RWND' into the received ACK message, and forwards the ACK message to the sender (block 540).

Congestion control agent 120 uses the flow ID for flow_x to perform a key value search of memory to retrieve the flow's WSF. In one implementation, congestion control agent 120 may rewrite RWND' as RWND'/WSF. Thus, the RWND' value determined in block 530 may be divided by the WSF to determine the RWND' value to be inserted into the window size field 425 of the header 400 of the ACK message.

Sender 130 receives the ACK message for flow_x and extracts RWND' (block 545), and continues sending data of flow_x to the receiver 140, with the unacknowledged data amount equal to the minimum of RWND' and the sender 130's congestion window size (block 550). Sender 130 sends a sequence of packets on the data stream/flow having a data size equal to the minimum of the received modified RWND' and the sender 130's congestion window size, and then waits on receipt of an ACK message for the sequence of packets before either retransmitting the sequence of packets (i.e., if no ACK message is received), or transmitting a next sequence of packets on the data stream/flow (i.e., if an ACK message for the previous sequence of packets is received).

Congestion control agent 120 determines if it has received an updated RTT, Rate, and/or WSF for flow_x (block 555). If not (NO—block 555), then the exemplary process returns to block 515 in FIG. 5A with the continued receipt and routing of packets for flow_x destined for the receiver. If congestion control agent 120 has received an updated RTT, Rate, and/or WSF (YES—block 555), then congestion control agent 120 stores the flow ID, the RTT, the Rate, and the WSF for flow_x in memory (block 560), and the exemplary process returns to block 515 in FIG. 5A with the exemplary process using any updated RTT, Rate, or WSF in subsequent determinations of modified RWND'. Congestion control agent 120 may receive updated traffic shaping policy parameters from congestion controller 100 that may, for example, include an updated RTT value and/or an updated Rate. Congestion controller 100 may provide updated traffic shaping policy parameters periodically, or upon an occurrence of one or more events or conditions. For example, if performance of the network degrades due to network node failures, or due to excessive data traffic, then congestion controller 100 may decrease the maximum Rate for one or more streams/flows.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A and 5B and a sequence of operations, messages, and data flows with respect to FIG. 1, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device, first traffic policy information associated with a first data stream in a network between a sender endpoint and a receiver endpoint of a first network session associated with an execution of a first type of application service, wherein the first traffic policy information includes first values for multiple traffic shaping policy parameters that apply to each of multiple data streams associated with execution of the first type of application service by other sender endpoints in the network;

forwarding, by the network device, the first data stream to the receiver endpoint;

receiving, by the network device, second traffic policy information associated with one or more of the multiple data streams, wherein the second traffic policy information includes second values for the multiple traffic shaping policy parameters which differ from the first values for the multiple traffic shaping policy parameters;

obtaining, by the network device, an acknowledgement message from the receiver endpoint;

modifying, by the network device, the acknowledgement message based on the second values for the multiple traffic shaping policy parameters instead of the first values for the multiple traffic shaping policy parameters; and forwarding, from the network device, the modified acknowledgement message to the sender endpoint to control the first data stream.

2. The method of claim 1, wherein the first values for the multiple traffic shaping policy parameters comprise a maximum round trip delay time and a maximum throughput rate.

3. The method of claim 2, wherein the first data stream comprises a Transmission Control Protocol (TCP) data stream, the method further comprising:

calculating a bandwidth delay based on a product of the maximum round trip delay time and the maximum throughput rate.

4. The method of claim 3, wherein obtaining the acknowledgement message includes obtaining a receiver advertised window size associated with the receiver endpoint, and wherein modifying the acknowledgement message includes generating a modified receiver advertised window size using the bandwidth delay.

5. The method of claim 4, wherein generating the modified receiver advertised window size comprises:

determining a minimum value between the receiver advertised window size and the bandwidth delay; and setting the modified receiver advertised window size equal to the determined minimum value.

6. The method of claim 1, wherein forwarding the modified acknowledgement message to the sender endpoint to control the first data stream includes:

forwarding the modified acknowledgement message to the sender endpoint to control a use of an amount of buffer space of network devices in a network path of the first data stream.

7. The method of claim 1, wherein the network device comprises a network edge router, the method further comprising determining the first values for the multiple traffic shaping policy parameters.

8. A network device, comprising:

a processor or logic configured to:

receive first traffic policy information associated with a first data stream in a network between a sender endpoint and a receiver endpoint of a first network session associated with an execution of a first type of application service, wherein the first traffic policy information includes first values for multiple traffic shaping policy parameters that apply to each of multiple data streams associated with execution of the first type of application service by other sender endpoints in the network;

forward the first data stream to the receiver endpoint;

receive second traffic policy information associated with one or more of the multiple data streams, wherein the second traffic policy information includes second values for the multiple traffic shaping policy parameters which differ from the first values for the multiple traffic shaping policy parameters;

obtain an acknowledgement message from the receiver endpoint for the first data stream;

modify the acknowledgement message based on the second values for the multiple traffic shaping policy parameters instead of the first values for the multiple traffic shaping policy parameters; and forward the modified acknowledgement message to the sender endpoint to control the first data stream.

9. The network device of claim 8, wherein the first values for the multiple traffic shaping policy parameters comprise a maximum round trip delay time and a maximum throughput rate.

10. The network device of claim 9, wherein the first data stream comprises a Transmission Control Protocol (TCP) data stream, the processor or logic being further configured to:

calculate a bandwidth delay based on a product of the maximum round trip delay time and the maximum throughput rate.

11. The network device of claim 10, wherein, when obtaining the acknowledgement message, the processor or logic is further configured to:

obtain a receiver advertised window size associated with the receiver endpoint, and wherein, when modifying the acknowledgement message, the processor or logic is further configured to:

generate a modified receiver advertised window size using the bandwidth delay.

12. The network device of claim 11, wherein, when generating the modified receiver advertised window size, the processor or logic is further configured to:

determine a minimum value between the receiver advertised window size and the bandwidth delay; and set the modified receiver advertised window size equal to the determined minimum value.

13. The network device of claim 8, wherein, when forwarding the modified acknowledgement message to the sender endpoint to control the first data stream, the processor or logic is further configured to:

forward the modified acknowledgement message to the sender endpoint to control a use of an amount of buffer space of network devices in a network path of the first data stream.

14. The network device of claim 8, wherein the network device comprises a network edge router, and wherein the processor or logic is further configured to determine the first values for the multiple traffic shaping policy parameters.

15. A non-transitory storage medium storing instructions executable by a network device, wherein the instructions comprise instructions to cause the network device to:

receive first traffic policy information associated with a first data stream in a network between a sender endpoint and a receiver endpoint of a first network session associated with an execution of a first type of application service, wherein the first traffic policy information includes first values for multiple traffic shaping policy parameters that apply to each of multiple data streams associated with execution of the first type of application service by other sender endpoints in the network;

forward the first data stream to the receiver endpoint;

receive second traffic policy information associated with one or more of the multiple data streams, wherein the second traffic policy information includes second values for the multiple traffic shaping policy parameters which differ from the first values for the multiple traffic shaping policy parameters;

obtain an acknowledgement message from the receiver endpoint for the first data stream;

modify the acknowledgement message based on the second values for the multiple traffic shaping policy parameters instead of the first values for the multiple traffic shaping policy parameters; and forward the modified acknowledgement message to the sender endpoint to control the first data stream.

16. The non-transitory storage medium of claim 15, wherein the multiple traffic shaping policy parameters comprise a maximum round trip delay time and a maximum throughput rate.

17. The non-transitory storage medium of claim 16, wherein the first data stream comprises a Transmission Control Protocol (TCP) data stream, the instructions to further cause the network device to:

calculate a bandwidth delay based on a product of the maximum round trip delay time and the maximum throughput rate.

18. The non-transitory storage medium of claim 17, wherein the instructions to cause the network device to obtain the acknowledgement message comprise instructions to further cause the network device to:

obtain a receiver advertised window size associated with the receiver endpoint, and wherein the instructions to cause the network device to modify the acknowledgement message further comprise instructions to cause the network device to:

generate a modified receiver advertised window size using the bandwidth delay.

19. The non-transitory storage medium of claim 18, wherein the instructions to cause the network device to generate the modified receiver advertised window size comprise instructions to further cause the network device to:

determine a minimum value between the receiver advertised window size and the bandwidth delay; and set the modified receiver advertised window size equal to the determined minimum value.

20. The non-transitory storage medium of claim 15, wherein the instructions to cause the network device to forward the modified acknowledgement message to the sender endpoint to control the first data stream further comprise instructions to further cause the network device to:

forward the modified acknowledgement message to the sender endpoint to control a use of an amount of buffer space of network devices in a network path of the first data stream.

* * * * *